United States Patent
Okuda et al.

(10) Patent No.: US 9,341,886 B2
(45) Date of Patent: May 17, 2016

(54) IMAGE DISPLAY DEVICE

(71) Applicant: Mitsubishi Electric Corporation, Tokyo (JP)

(72) Inventors: Noritaka Okuda, Tokyo (JP); Masaaki Hanai, Tokyo (JP); Hironobu Yasui, Tokyo (JP); Hideki Yoshii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 13/887,794

(22) Filed: May 6, 2013

(65) Prior Publication Data
US 2013/0314641 A1 Nov. 28, 2013

(30) Foreign Application Priority Data

May 25, 2012 (JP) .................................. 2012-119294

(51) Int. Cl.
*G02F 1/1335* (2006.01)
*G09G 3/34* (2006.01)
*G09G 3/36* (2006.01)

(52) U.S. Cl.
CPC .............. *G02F 1/1336* (2013.01); *G09G 3/342* (2013.01); *G09G 3/36* (2013.01); *G09G 2310/024* (2013.01); *G09G 2310/0237* (2013.01); *G09G 2320/0261* (2013.01); *G09G 2360/145* (2013.01)

(58) Field of Classification Search
CPC .............. G09G 3/3406–3/3426; G09G 3/342; G09G 3/341; G09G 2310/0237; G09G 2310/024; G09G 2360/145; G02F 1/1336
See application file for complete search history.

(56) References Cited

U.S. PATENT DOCUMENTS

| | | | |
|---|---|---|---|
| 7,193,356 B2 | 3/2007 | Kokubo et al. | |
| 7,468,721 B2 | 12/2008 | Nakano | |
| 7,737,937 B2 | 6/2010 | Fisekovic et al. | |
| 8,035,603 B2 * | 10/2011 | Furukawa et al. | 345/102 |
| 2004/0095402 A1 | 5/2004 | Nakano | |
| 2005/0116609 A1 | 6/2005 | Kokubo et al. | |
| 2007/0211013 A1 * | 9/2007 | Uehara et al. | 345/102 |
| 2007/0242459 A1 * | 10/2007 | Nishigaki | 362/276 |
| 2007/0291197 A1 | 12/2007 | Furukawa et al. | |
| 2008/0100645 A1 | 5/2008 | Nitta | |
| 2011/0050110 A1 * | 3/2011 | Han | 315/185 R |
| 2011/0169871 A1 * | 7/2011 | Suzuki et al. | 345/690 |
| 2012/0176358 A1 | 7/2012 | Kaji et al. | |

FOREIGN PATENT DOCUMENTS

| | | |
|---|---|---|
| CN | 101029985 A | 9/2007 |
| CN | 101055374 A | 10/2007 |
| CN | 101414437 A | 4/2009 |
| JP | 2002-123222 A | 4/2002 |

(Continued)

*Primary Examiner* — Latanya Bibbins
(74) *Attorney, Agent, or Firm* — Birch, Stewart, Kolasch & Birch, LLP

(57) ABSTRACT

An image display device includes a liquid crystal panel section, a light source section divided into a plurality of regions, a light detection section detecting the light intensity of the light source section, and a timing generation section. The timing generation section generates a light emission drive signal which turns on each of the regions of the light source section according to scanning in the liquid crystal panel section, and which turns on all the regions of the light source section in a light detection period, and generates a light detection gate signal allowing the detection of the light detection section to be effective in the light detection period.

6 Claims, 14 Drawing Sheets

(56) References Cited

FOREIGN PATENT DOCUMENTS

| | | |
|---|---|---|
| JP | 2005-164710 A | 4/2002 |
| JP | 2004-170721 A | 6/2004 |
| JP | 2007-287422 A | 11/2007 |
| JP | 2007-537477 A | 12/2007 |
| JP | 2008-102499 A | 5/2008 |
| JP | 2009-211938 A | 9/2009 |
| JP | 2011-90046 A | 5/2011 |
| TW | 200810568 A | 2/2008 |
| TW | 201117661 A1 | 5/2011 |
| TW | 201128605 A1 | 8/2011 |
| WO | WO 2005/111976 A1 | 11/2005 |

\* cited by examiner

F I G . 1
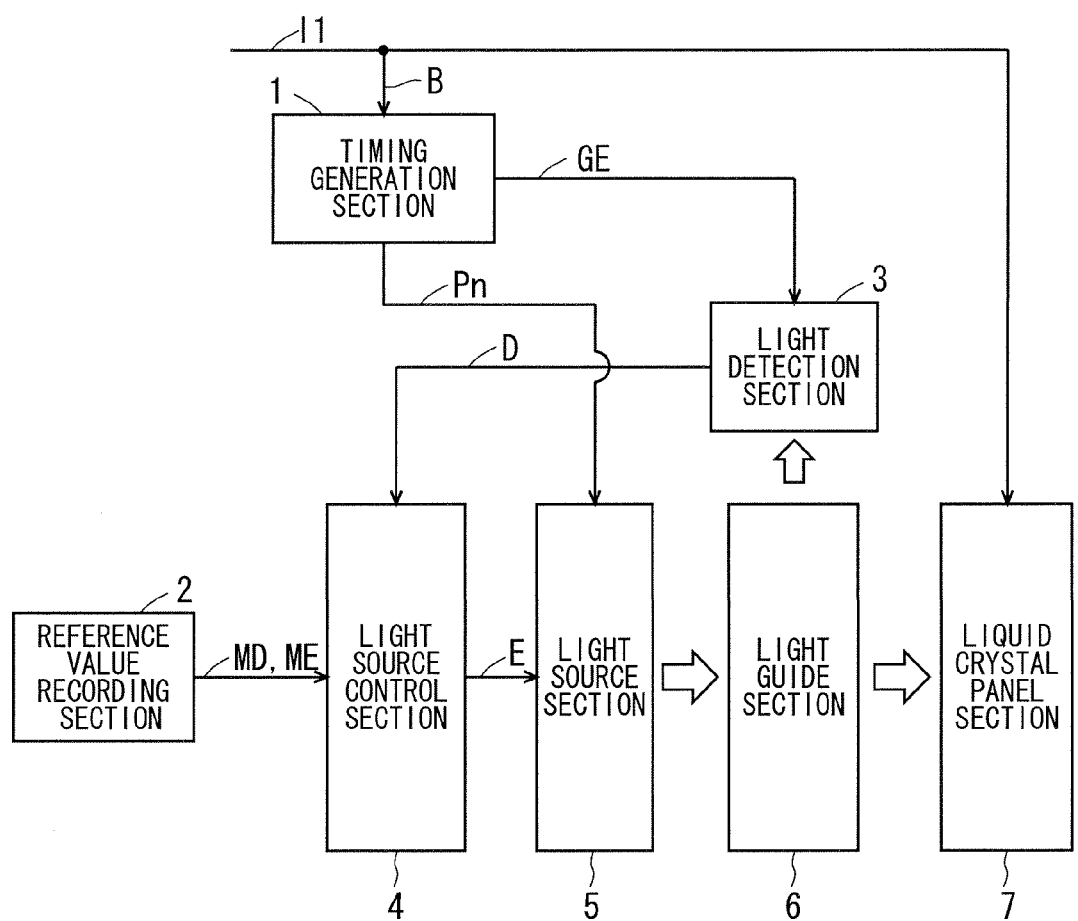

F I G. 1 4 A
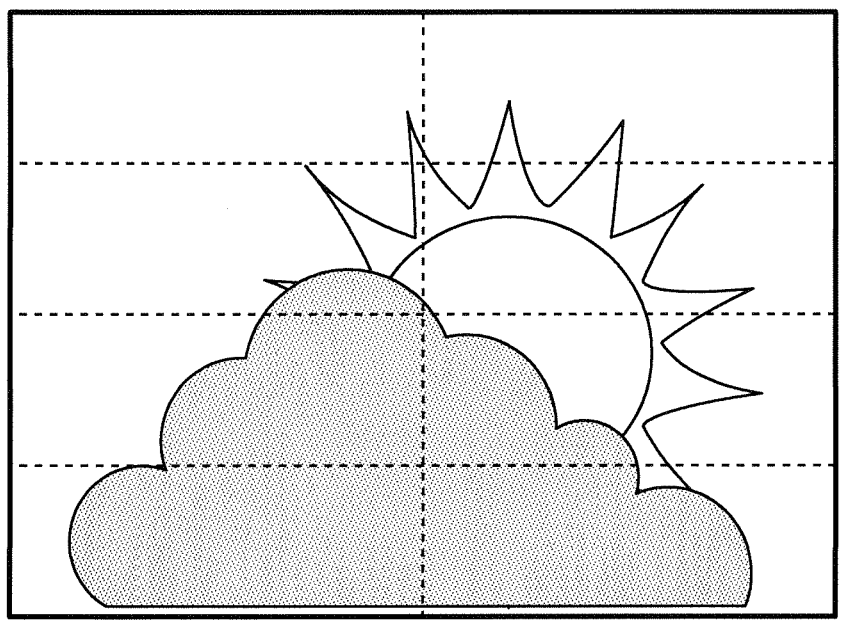
F I G. 1 4 B
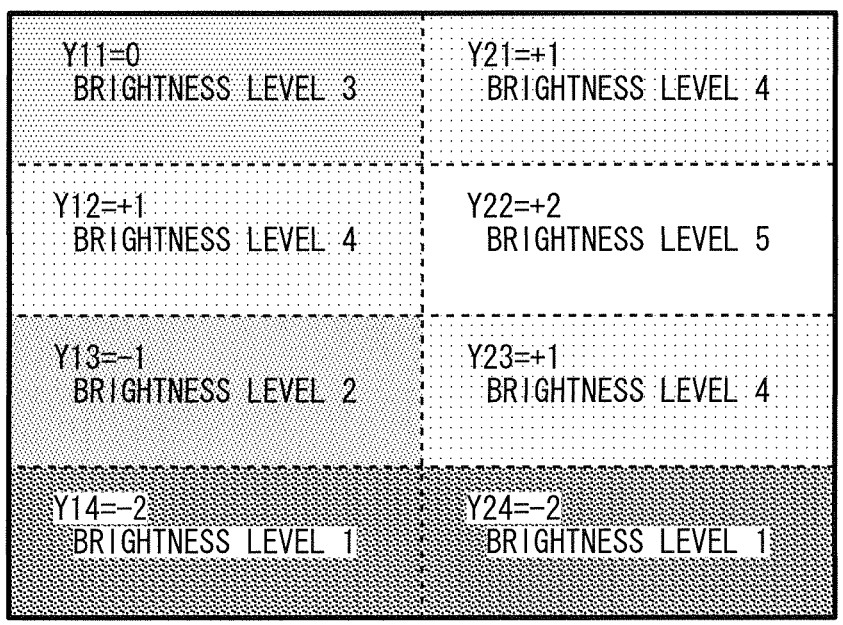

IMAGE DISPLAY DEVICE

BACKGROUND OF THE INVENTION

1. Field of the Invention

The present invention relates to an image display device, such as a liquid crystal display device. More specifically, the present invention relates to an image display device which performs turning-on control in each of a plurality of regions on the rear surface of a panel, such as a liquid crystal panel section.

2. Description of the Background Art

A liquid crystal panel (liquid crystal panel section) which is thin and lightweight is widely used for the display section of a television receiver. However, the liquid crystal which requires a fixed period of time to reach desired transmittance from the application of driving voltage cannot respond to a fast-changed moving image. To solve such a problem, proposed is a technique in which the backlight provided on the rear surface of the liquid crystal panel is divided into a plurality of regions to be controlled so as to be turned on and off in each of the regions (backlight scanning) according to the timing of top-to-bottom scanning on the liquid crystal panel performed based on a video signal.

More specifically, after the driving voltage corresponding to the video signal is applied to the liquid crystal, the backlight in the corresponding region is continuously turned off until the liquid crystal approaches the desired transmittance, and at the time of approaching the desired transmittance, the backlight is turned on, whereby such control is repeated in each frame of the video signal. Such control allows the liquid crystal not to display the video in the period until the liquid crystal approaches the desired transmittance. Therefore, the fast-changed moving image can be displayed with less blurring.

On the other hand, the light source used for the backlight provided on the rear surface of the liquid crystal panel changes its brightness according to temperature change and with time. In addition, in the backlight using the light source in a plurality of colors, the change of the balance between the colors varies color temperature at the time of displaying white color.

To solve these problems, in the backlight system, the liquid crystal display device, and the backlight adjusting method disclosed in Japanese Patent Application Laid-Open No. 2007-287422, when the light emitting units configuring the backlight are controlled to be sequentially turned on (or off), each of the light emitting units of the backlight is independently turned on to detect its light amount by the photosensor. Then, the light amount of each of the light emitting units is feedback-controlled according to the detection result of the each of the light emitting unit. Therefore, good white balance without color shift can be realized.

However, when the control in Japanese Patent Application Laid-Open No. 2007-287422 is performed, it is necessary to independently turn on each of the divided backlight units (corresponding to each of the light emitting units) to detect its light amount by the photosensor. That is, since it is necessary to independently turn on the backlight unit in each of the regions in non-overlapped manner, the light emission period of the backlight unit in the region cannot be increased over a fixed period of time, with the result that the average brightness (contrast) per time cannot be higher. In addition, when the light emission periods of the backlight unit in each of the regions and the backlight unit in the region adjacent thereto are controlled to overlapped with each other to improve video contrast, the light amount of the backlight unit in each of the regions is affected by the light amount of the backlight unit in the region adjacent thereto with the result that another problem occurs.

Further, when other than the actual video display period, a light amount detection period is provided so that in the period, the backlight units are controlled to be sequentially independently turned on to detect their light amounts by the photosensor, the light amount detection period becomes longer in the case that the number of divided backlight units is large, which gives an unfavorable influence on video display.

SUMMARY OF THE INVENTION

The present invention has been made in view of the above problems, and an object of the present invention is to provide a technique which can stably and precisely perform light intensity detection for controlling the light emission intensity of each of the regions of a light source section.

The present invention provides an image display device including a liquid crystal panel section, a light source section, a light detection section, a light source control section, and a timing generation section. The liquid crystal panel section performs sequentially scanning in a predetermined direction in synchronization with an image signal to convert the transmittance of light according to the gray scale level of the image signal. The light source section is divided into a plurality of regions. The light detection section detects the light intensity of the light source section. The light source control section controls the light emission intensity of the light source section based on the light detection value detected by the light detection section. The timing generation section generates a light emission drive signal allowing the light source section to emit light and a light detection gate signal allowing the light detection section to detect the light intensity of the light source section, based on an image reference signal included in the image signal. In addition, the timing generation section generates the light emission drive signal which turns on each of the regions of the light source section according to the scanning in the liquid crystal panel section, and which turns on all the regions of the light source section in a predetermined period, and generates the light detection gate signal allowing the detection of the light detection section to be effective in the predetermined period.

All the regions of the light source section are controlled to be turned on at the timing at which the light detection section performs light detection. This can stably and precisely perform light intensity detection for controlling the light emission intensity of each of the regions of the light source section.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the configuration of an image display device according to a first preferred embodiment;

FIGS. 14A and 14B are diagrams showing the operation of the image display device according to the third preferred embodiment.

DESCRIPTION OF THE PREFERRED EMBODIMENTS

First Preferred Embodiment

Figure 2:
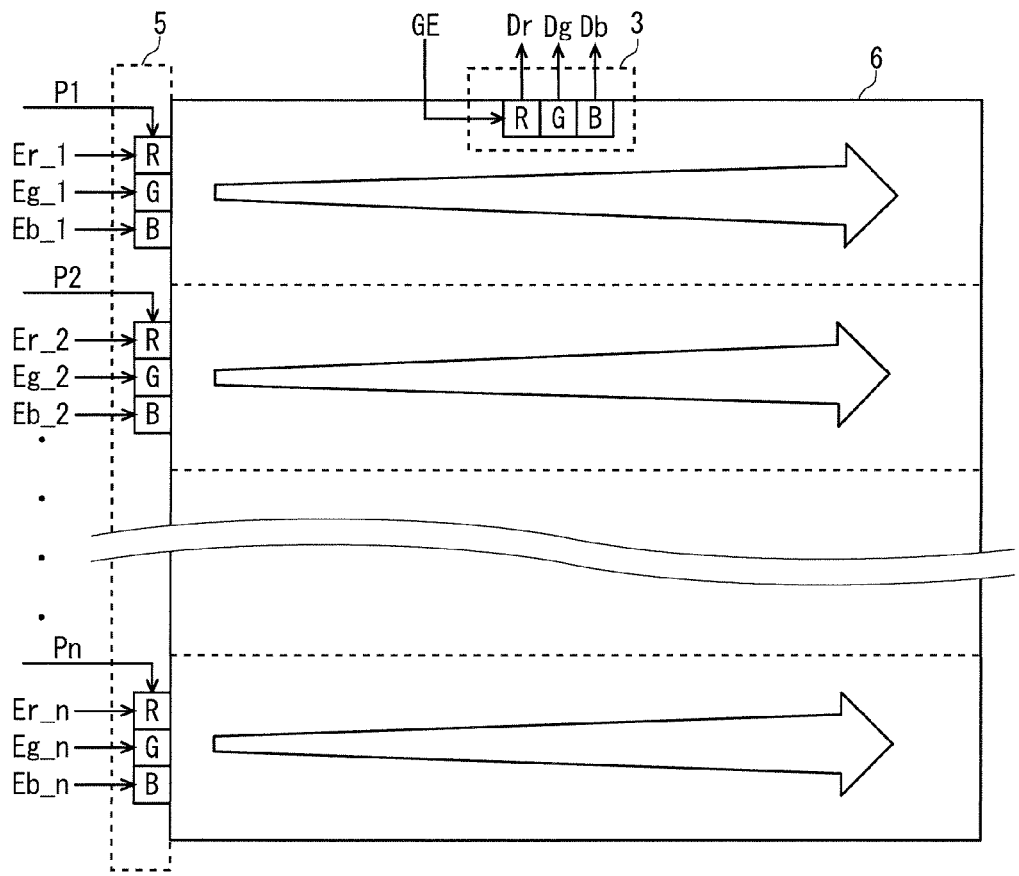
FIG. 2 is a diagram showing the arrangement of the components of the image display device according to the first preferred embodiment.

FIG. 1 is a block diagram showing the configuration of an image display device according to a first preferred embodiment of the present invention. The image display device shown in FIG. 1 includes a timing generation section 1, a reference value recording section 2, a light detection section 3 having a photosensor, a light source control section 4, a light source section 5, a light guide section 6, and a liquid crystal panel section 7. The light source section 5 is divided into a plurality of regions (here, n regions; n≥2), and has a light source in each of the regions. Each of the regions of the light source section 5 is called as a "divided region".

In the image display device, as indicated by the outline arrows shown in FIG. 1, light emitted from the light source section 5 is inputted to the light guide section 6, and is made uniform in surface shape. The light guide section 6 emits the uniform light (that is, the light received from the light source section 5) to the liquid crystal panel section 7. The liquid crystal panel section 7 changes the transmittance of the light received from the light guide section 6 in each pixel, so that a desired image can be displayed.

Image signal I1 is inputted to the liquid crystal panel section 7. In addition, image reference signal B included in image signal I1 is inputted to the timing generation section 1. Here, image reference signal B is vertical synchronization signal V included in image signal I1. Image signal I1 may be inputted to the timing generation section 1. The timing generation section 1 then extracts image reference signal B from image signal I1.

The timing generation section 1 generates light detection gate signal GE allowing the light detection section 3 to detect the light intensity of the light source section 5 based on image reference signal B, and then outputs light detection gate signal GE to the light detection section 3. That is, the timing generation section 1 can control the light detection section 3 by using light detection gate signal GE.

In addition, the timing generation section 1 generates light emission drive signal Pn turning on and off the light source section 5 based on image reference signal B, and then outputs light emission drive signal Pn to the light source section 5.

That is, the timing generation section 1 can independently control the light source of the light source section 5 in each of the divided regions by using light emission driving drive Pn. The light emission drive signal Pn includes same number of signals as the number of the divided regions of the light source section 5.

The reference value recording section 2 records and holds reference light detection value MD and reference light emission intensity value ME which are set previously, and outputs these values to the light source control section 4, as needed. The reference value recording section 2 holds reference light detection values MD, the number thereof is equal to the number of combinations of photosensors of the light detection section 3 and light colors which can be detected by the photosensors. The reference value recording section 2 holds reference light emission intensity values ME, the number thereof is equal to the number of combinations of the divided regions of the light source section 5 and light source colors of the light source section 5.

Next, a method of determining reference light detection value MD and reference light emission intensity value ME to be recorded and held will be described. First, a reference signal, e.g., a signal in which all colors of all pixels have the highest gray scale level (all white signal) is inputted to the image display device according to this preferred embodiment for operation. Then, the light emission intensity value of each color of the light source is adjusted in each of the divided regions so that the output light of the liquid crystal panel section 7 has a target brightness value, white balance, and color temperature. In addition, in order that the brightness of the screen is uniform or there is no color unevenness, the light emission intensity value of the light source is adjusted in each of the divided regions. After that, when the output light of the liquid crystal panel section 7 is adjusted to the target value as described above, the reference value recording section 2 records and holds the light detection value of the light detection section 3 as reference light detection value MD, and records and holds the light emission intensity value inputted to the light source in each of the divided regions as reference light emission intensity value ME.

Since the light source changes its brightness according to temperature change and with time, the reference value recording section 2 may record and hold reference light detection value MD and reference light emission intensity value ME according to the temperature conditions and turning-on accumulation time. For instance, reference light emission intensity value ME at low temperature and reference light emission intensity value ME at high temperature are separately determined. Therefore, the liquid crystal can immediately converge on the target color. In addition, for instance, since when the accumulation time in which the light source is turned on is increased, the light source typically becomes dark, reference light detection value MD may be decreased with the turning-on accumulation time. In this case, immediately before the light source is turned off, later-described light emission intensity value E outputted from the light source control section 4 to the light source section 5 may be recorded and held in the reference value recording section 2, and at the start of the next turning-on, the light source control section 4 may output recorded and held light emission intensity value E to the light source section 5. By determining reference light detection value MD as described above, the liquid crystal can immediately converge on the target brightness and color. The change of these reference values should be determined according to the characteristic of the device used as the light source.

In addition, the reference value recording section 2 may record and hold reference light detection value MD and reference light emission intensity value ME for each of target white color and of target color temperature with respect to the output light from the liquid crystal panel section 7. This can change the setting of color temperature or the like by adjusting the light emission intensity of the light source.

The light of the light guide section 6 (the light of the light source section 5) is inputted to the light detection section 3. The light detection section 3 includes one or more photosensors so as to detect the light intensity of one or more colors in the light of the light guide section 6 (the light of the light source section 5). The light detection section 3 performs the light detection operation which detects the light intensity of the light source section 5 in the period in which light detection gate signal GE outputted from the timing generation section 1 is significant, and then outputs the value of the detected result as light detection value D to the light source control section 4. Light detection value D is a voltage value in proportion to the light intensity of the light source section 5.

The photosensor of the light detection section 3 may include one brightness sensor which can detect a brightness value, or a color sensor which can detect the light amount in three colors of red (R), green (G), and blue (B). Any type of photosensor may be used; for instance, a photocell, a photodiode, or a combination of them and an optical filter may be used. When the multicolor photosensor is used, light detection value D is outputted according to the number of colors.

The light detection section 3 may be provided in any place as long as the light detection section 3 is provided between the light guide section 6 and the liquid crystal panel section 7.

In the initial state, the light source control section 4 outputs reference light emission intensity value ME recorded and held in the reference value recording section 2, as light emission intensity value E, to the light source section 5. Thereafter, the light source control section 4 determines light emission intensity value E of the light source section 5 in each of the divided regions, based on light detection value D detected by the light detection section 3 and reference light detection value MD which is previously set in the reference value recording section 2.

Specifically, the light source control section 4 compares light detection value D from the light detection section 3 with reference light detection value MD from the reference value recording section 2, determines light emission intensity value E so that reference light detection value MD and light detection value D are substantially equal to each other, and outputs light emission intensity value E to the light source section 5. Here, light emission intensity value E is e.g., an electric current value, and the light source section 5 to which light emission intensity value E is inputted emits light in the light amount in proportion to light emission intensity value E. When the light source section 5 is configured in this manner, the light source control section 4 controls light emission intensity value E to be increased when light detection value D is lower than reference light detection value MD, and controls light emission intensity value E to be decreased when light detection value D is higher than reference light detection value MD. In this way, the light source control section 4 controls light detection value D to be substantially equal to reference light detection value MD, so that the output light of the light source section 5 can be equal to the target value.

The number of light emission intensity values E outputted from the light source control section 4 is equal to the number of the divided regions of the light source section 5. In addition, in the comparison of reference light detection value MD and light detection value D, the extent to which reference light detection value MD and light detection value D are close to each other, which is used in order to assume that those are substantially equal to each other, should be determined at the time of designing in consideration of the balance between the change of the desired brightness and color and adjustment converging time.

In the above description, the light source control section 4 controls the light emission intensity of the light source section 5, based on light detection value D detected by the light detection section 3 and reference light detection value MD set previously. However, without being limited to this, the light source control section 4 may calculate light emission intensity value E of the light source section 5 by plugging light detection value D detected by the light detection section 3 into a predetermined equation, to control the light source section 5 by calculated light emission intensity value E.

The light source section 5 includes n divided regions, and the number of colors of the light source provided in each of the divided regions is 1 or more. The light source in each of the divided regions of the light source section 5 emits light in the light amount corresponding to light emission intensity value E outputted from the light source control section 4 in the period indicated by light emission drive signal Pn outputted from the timing generation section 1. Hereinafter, the turning-on and -off of the light source in the divided region is sometimes referred to as turning-on and -off of the divided region.

The light source section 5 may include a white light source, or may mix the lights from a multicolor light source, e.g., from a three-color light source in red (R), green (G), and blue (B), or a two-color light source in cyan (C) and red (R), thereby to generate white light. Any type of light emitter of the light source may be used; for instance, a light emitting diode (LED), a laser, an organic electroluminescence (organic EL), or a combination of these may be used.

The light source in each of the divided regions of the light source section 5 can be independently controlled in each of the divided regions. The light source section 5 may be arranged just below the liquid crystal panel section 7, or may be arranged at the left and right ends or the upper and lower ends of the liquid crystal panel.

The light source section 5 emits pulsed light by light emission drive signal Pn, and varies the light emission intensity according to light emission intensity value E. Specifically, the light emission drive signal Pn is composed of same number of signals as the number of divided backlights (that is, the number of divided regions n), and the light source in each of the divided regions is turned on in the light amount indicated by corresponding light emission intensity value E in the period indicated by corresponding light emission drive signal Pn. For instance, the light source in each of the divided regions is controlled to be turned on in the High period of light emission drive signal Pn and to be turned off in the Low period thereof. The number of light emission intensity values E may be equal to the number of combinations of divided regions (n) and light source colors (m), that is, n×m, be equal to the number of light source colors (m), or be equal to the number of divided regions (n).

The light guide section 6 uniformly surface-diffuses the light from the light source section 5 in the predetermined region, and then emits the light to the rear surface of the liquid crystal panel section 7. In addition, when the light source section 5 includes a multicolor light source in red (R), green (G), and blue (B), the light guide section 6 mixes the lights in multiple colors to generate white color. Although the light source section 5 is divided into n divided regions, the light guide section 6 may include one light guide plate to entirely diffuse the light.

The liquid crystal panel section 7 has e.g., a transmissive liquid crystal panel with arrayed color filters. The liquid crystal panel section 7 to which image signal I1 is inputted performs sequential scanning from top to bottom (in a predetermined direction) in synchronization with image signal I1, thereby to change the transmittance of the light from the rear surface to the front surface of the liquid crystal panel section 7 for each pixel according to the gray scale level of image signal I1. This displays an image on the liquid crystal panel section 7.

FIG. 2 shows an example of the arrangement of the light detection section 3, the light source section 5, and the light guide section 6 on the rear surface of the liquid crystal panel section 7. In the example shown in FIG. 2, the light guide plate which is one kind of the light guide section 6 is provided on the rear surface of the liquid crystal panel section 7, and the light source section 5 is arranged on the left side of the light guide plate (at the left end of the liquid crystal panel section 7). Here, the light detection section 3 is arranged at the upper end of the light guide plate in plan view, but, as described above, the light detection section 3 may be arranged in any place as long as the light detection section 3 is arranged between the light guide section 6 and the liquid crystal panel section 7.

In FIG. 2, the light sources which can be independently controlled (in FIG. 2, the three-color light sources in red (R), green (G), and blue (B)) are arranged in n divided regions arrayed in the vertical direction in the light source section 5. The light emitted from the light source section 5 is surface-diffused by the light guide section 6, and is then guided from end to end of the liquid crystal panel in plan view. During light guiding, the lights of the three-color light source in red (R), green (G), and blue (B) are mixed to be white light. Then, the diffused light is detected by the light detection section 3. For instance, in FIG. 2, $Er\_1$, $Eg\_1$, and $Eb\_1$ mean light emission intensity value E of the three-color light source in the upper divided region of FIG. 2, and Dr, Dg, and Db mean light detection value D of the three colors.

The light guide section 6 can diffuse the light in a wide range without light unevenness. Therefore, the light emitted from the light source in one divided region of the light source section 5 illuminates one corresponding region of the light guide section 6 (the range indicated by the dotted line on the light guide section 6 in FIG. 2), and slightly illuminates the region adjacent thereto and the region away therefrom in the light guide section 6. In other words, one region of the light guide section 6 is illuminated, with the total light amount of the light emitted from the light source in one corresponding divided region, and the slight lights emitted from the light source in the divided region adjacent thereto and the light source in the divided region away therefrom.

Figure 3:
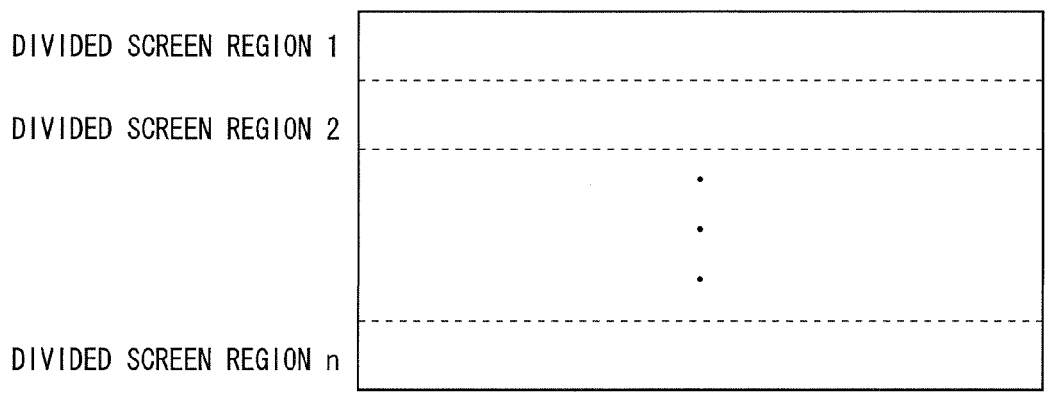
FIG. 3 is a diagram showing the screen of the image display device according to the first preferred embodiment.

Next, a further detailed operation of the image display device of this preferred embodiment will be described. FIG. 3 is a diagram showing the screen of the liquid crystal panel (liquid crystal panel section 7) of the image display device. Here, as shown in FIG. 3, the screen of the liquid crystal panel (liquid crystal panel section 7) is divided into n in the vertical direction without being divided in the horizontal direction. Each of the regions obtained from this division (hereinafter, called as a "divided screen region") and each of the divided regions of the light source section 5 coincide with each other, so that each of the divided screen regions (the light source in each of the divided regions) can be independently controlled to be turned on and off. When the screen of the liquid crystal panel is also divided in the horizontal direction, in order that a group of the divided screen regions located in the same position in the vertical direction is turned on at the same timing, the turning-on of the light sources in the corresponding group of the divided regions should be controlled.

Figure 4:
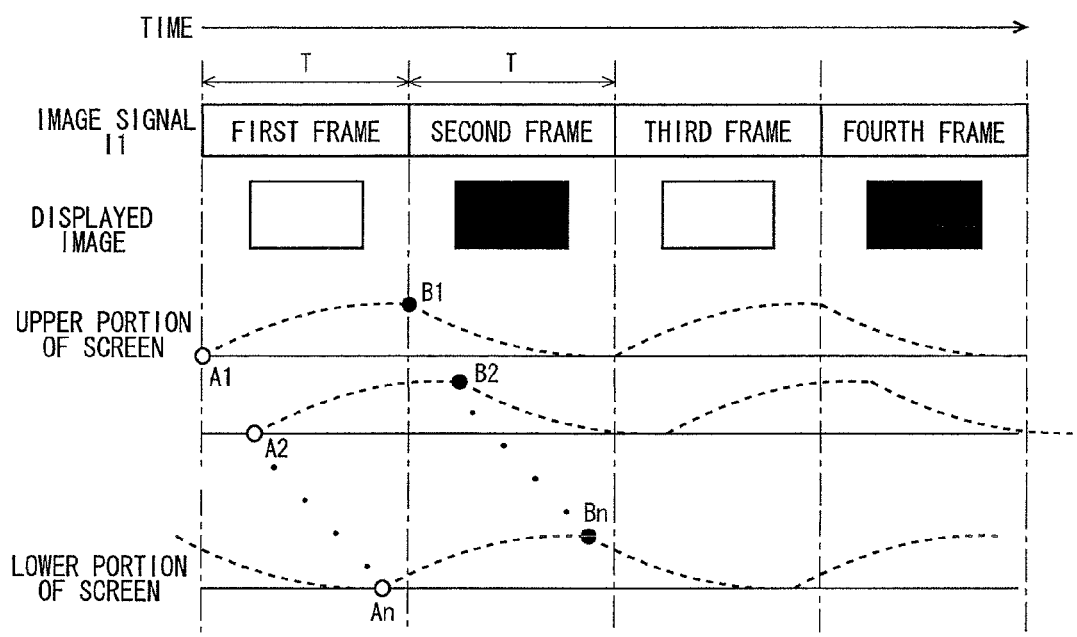
FIG. 4 is a timing chart showing an image signal and liquid crystal response.

FIG. 4 is a timing chart showing the timing relation between image signal I1 and liquid crystal response (change in transmittance) of the liquid crystal panel section 7. In the example of FIG. 4, image signal I1 inputted to the liquid crystal panel section 7 is a signal for alternately displaying the white screen and the black screen. In FIG. 4, the horizontal axis represents time, and the dotted line extending along the horizontal axis represents change in transmittance of the liquid crystal panel.

FIG. 4 shows change in transmittance of the liquid crystal in each of the divided screen regions from the upper portion to the lower portion of the screen of the liquid crystal panel section 7. Point A1 indicates the timing at which writing the gray scale level in the first frame is started in the uppermost divided screen region (the first top divided screen region), and point B1 indicates the timing at which writing the gray scale level in the second frame is started in the same region. Point A2 indicates the timing at which writing the gray scale level in the first frame is started in the second top divided screen region, and point B2 indicates the timing at which writing the gray scale level in the second frame is started in the same region. Hereinafter, this is ditto for points An and Bn. The dotted line indicating liquid crystal response in FIG. 4 indicates liquid crystal response on the uppermost scanning line in the vertical position in each of the divided screen regions. In addition, the displayed image in FIG. 4 is the image displayed in case points A1 to An and points B1 to Bn for all the divided screen regions are put in order. Actually, points A1 to An and points B1 to Bn are not put in order, so that the white color and the black color are intermixed in the displayed image in one frame.

Next, writing the gray scale level in each of the divided screen regions will be described in detail.

First, writing into the liquid crystal in the uppermost divided screen region will be described. White color in the first frame (strictly, the gray scale level corresponding to the region) is written into the liquid crystal in the uppermost divided screen region at the timing of point A1 in FIG. 4. The liquid crystal into which white color is written gradually responds thereto to increase the transmittance. Thereafter, black color in the second frame is written into the liquid crystal in the uppermost divided screen region at the timing of point B1. The liquid crystal into which black color is written gradually responds thereto to decrease the transmittance. As shown in FIG. 4, the liquid crystal sufficiently responds immediately before point B1, that is, immediately before the first frame is changed to the second frame, so that the liquid crystal approaches the target transmittance corresponding to white color in the first frame. With this, immediately before point B1, turning on the light source in the divided region corresponding to the uppermost divided screen region where the liquid crystal sufficiently responds, enable only the state of the liquid crystal which has reached the target gray scale level to be displayed.

Next, writing into the liquid crystal in the lowermost divided screen region will be described. White color in the first frame (strictly, the gray scale level corresponding to the region) is written into the liquid crystal in the lowermost divided screen region at the timing of point An in FIG. 4. Since the liquid crystal panel is scanned from top to bottom, point An indicating the write timing in the lowermost divided screen region is delayed from point A1 indicating the write timing of the uppermost divided screen region. Thereafter, black color in the second frame is written into the liquid crystal in the lowermost divided screen region at the timing of point Bn. As in the uppermost divided screen region, in the lowermost divided screen region, the liquid crystal sufficiently responds immediately before point Bn, that is, immediately before the first frame is changed to the second frame, so that the liquid crystal approaches the target transmittance corresponding to white color in the first frame. With this, immediately before point Bn, turning on the light source in the divided region corresponding to the lowermost divided screen region where the liquid crystal sufficiently responds, enable only the state of the liquid crystal which has reached the target gray scale level to be displayed.

As described above, when the light source in the corresponding divided region is controlled to be turned on immediately before the white frame is changed to the black frame, the video in a state where the liquid crystal sufficiently responds can be displayed. That is, the light emission of the light source in the corresponding divided region immediately before points B1, B2, . . . , Bn is appropriate in view of preventing moving image blur.

Accordingly, as described below, the timing generation section 1 according to this preferred embodiment generates light emission drive signal Pn which turns on each of the divided regions of the light source section 5 according to the scanning in the liquid crystal panel section 7. That is, immediately before points B1, B2, . . . , Bn, that is to say, immediately before the white frame is changed to the black frame, the timing generation section 1 performs control of turning on the light source in the divided region corresponding to the divided screen region where the change will occur.

As described next, as the configuration which realizes such operation, for instance, the configuration such that the turning-on timing of the divided region is synchronized with the scanning timing (write timing) to sequentially shift the turning-on timing is conceivable.

Figure 5:
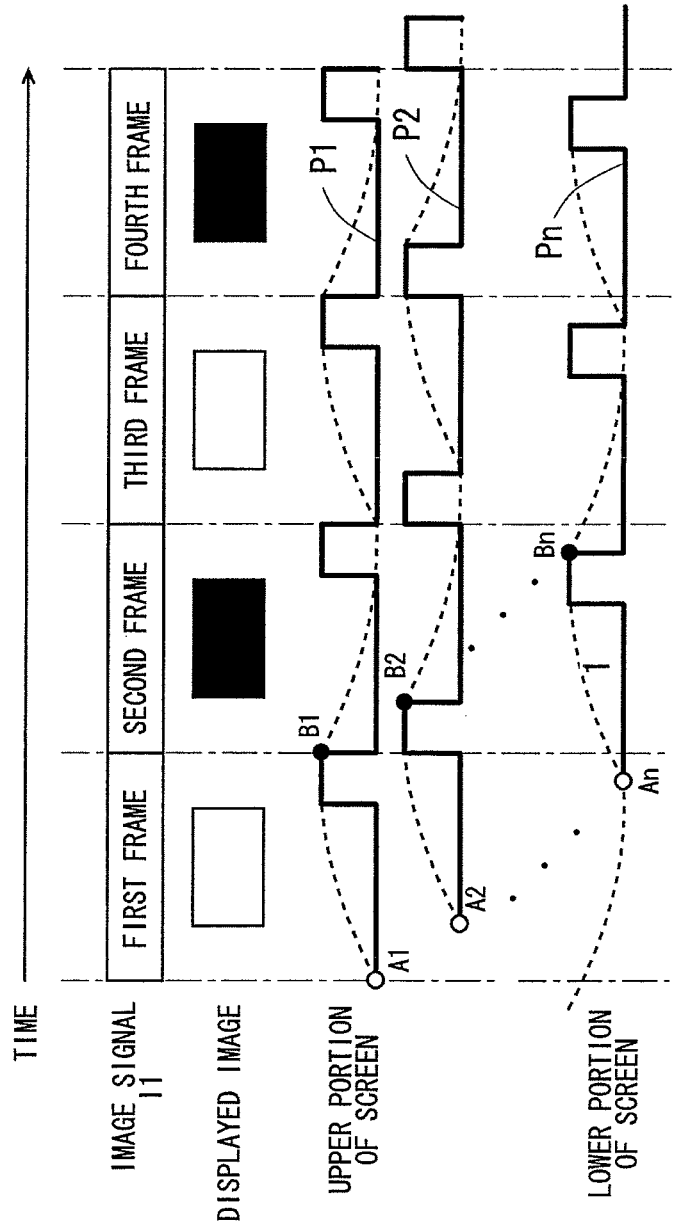
FIG. 5 is a timing chart showing an image signal, liquid crystal response, and a light emission drive signal.

FIG. 5 is a timing chart showing the timing relation among image signal I1, liquid crystal response of the liquid crystal panel section 7, and light emission drive signal Pn. The thick line shown in FIG. 5 indicates light emission drive signal Pn. Light emission drive signal Pn shown in FIG. 5 is the signal which falls near points B1, B2, . . . , Bn. The timing generation section 1 generates light emission drive signal Pn like this to sequentially shift the turning-on timing of the divided region of the light source section 5. Here, light emission drive signal Pn is represented by a binary signal, the Low level represents turning-off in each of the divided regions of the light source section 5, and the High level represents turning-on in each of the divided regions of the light source section 5. As described later, the shift amount of the turning-on timing of light emission drive signal Pn is determined according to frame cycle T of image signal I1 and the number of divided regions n in the vertical direction of the light source section 5.

Figure 6:
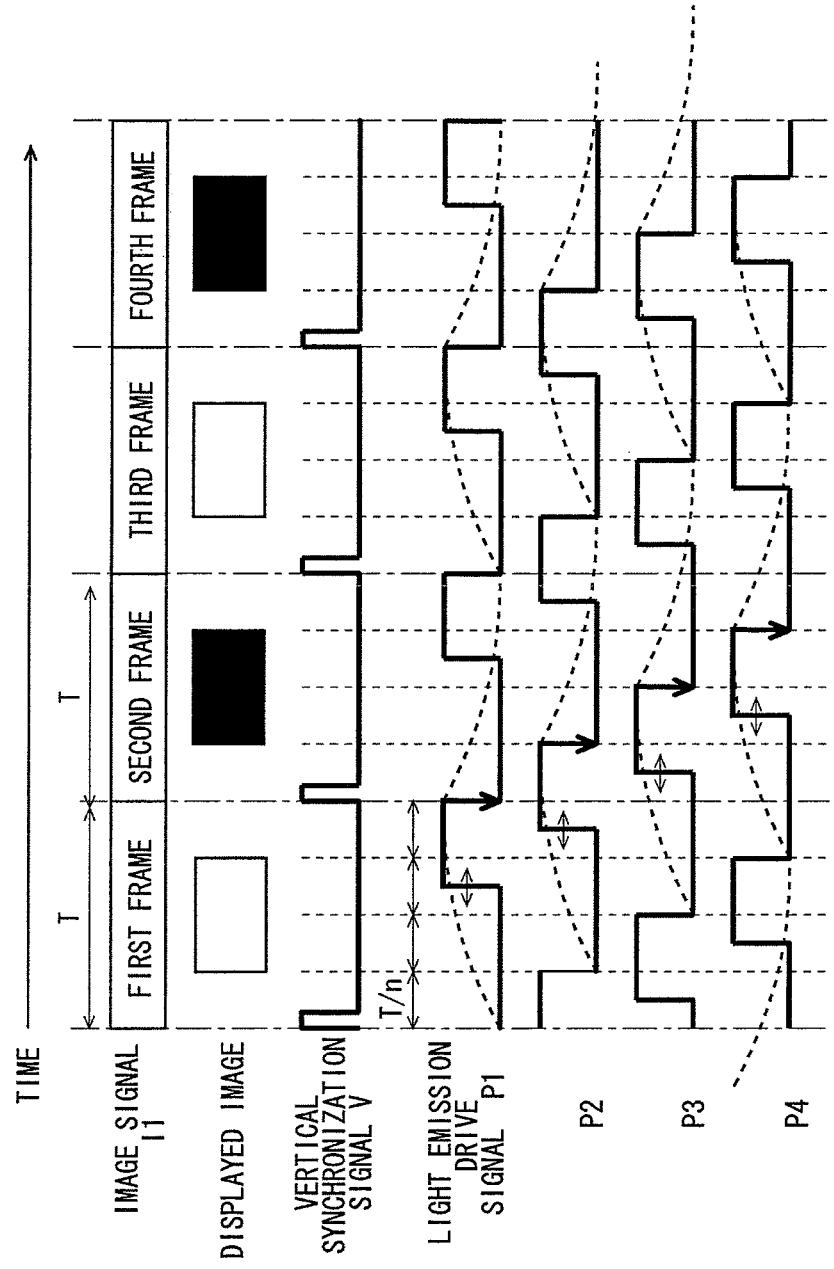
FIGS. 6 and 7 are timing charts each showing an image signal, liquid crystal response, and various signals.

FIG. 6 is a timing chart showing the timing relation among image signal I1, liquid crystal response of the liquid crystal panel section 7, light emission drive signal Pn, and vertical synchronization signal V included in image signal I1. Vertical synchronization signal V is the signal which indicates the head timing of each of the frames, and is synchronized with image signal I1. In the example of FIG. 6, T is the cycle of one frame. Like FIG. 5, in FIG. 6, the dotted line indicates liquid crystal response, and the thick solid line indicates light emission drive signal Pn inputted to the light source section 5. In FIG. 6, the number of divided regions of the light source section 5 is 4.

As described above, the light source in each of the divided regions is turned on near points B1, B2, . . . , Bn, so that the appropriate turning-on timing in consideration of liquid crystal response can be realized.

In the example shown in FIG. 6, the timing generation section 1 controls the fall point of light emission drive signal P1 corresponding to the uppermost divided screen region to set the fall point near points A1 and B1. Then, the timing generation section 1 controls the fall point of light emission drive signal P2 corresponding to the divided screen region adjacent to the uppermost divided screen region to set the fall point near points A2 and B2, that is to say, to delay the fall point by shift amount S of the time expressed by Equation (1) from the fall point of light emission drive signal P1.

[Equation 1]

$$S = \frac{T}{n} \quad (1)$$

That is, the timing generation section 1 generates the fall of light emission drive signal P1 delayed by time T from the rise of vertical synchronization signal V, and then performs time-shifting by shift amount S expressed by Equation (1) to generate the fall of light emission drive signals P2, P3, . . . , Pn. For instance, when as shown in FIG. 6, the number of divided regions of the light source section 5 is 4, the fall point of light emission drive signal P1 is located after period T from vertical synchronization signal V, and the fall point of light emission drive signal P2 is located after the T+T/4 period therefrom.

The High period of light emission drive signal Pn is the light emission period of the light source in the divided region. Therefore, when the brightness is increased, the timing generation section 1 changes the rise timing without changing the fall timing to increase the High period. On the other hand, when the brightness is decreased, the timing generation section 1 changes the rise timing without changing the fall timing to decrease the High period. In this manner, the timing generation section 1 fixes the fall timing of the light emission drive signal Pn to adjust the rise timing, thereby adjusting the brightness. The double-headed arrow shown in FIG. 6 indicates adjustment which increases or decreases the rise timing.

Here, the case where the number of divided regions in the vertical direction of the light source is small will be considered. In this case, the width in the vertical direction of one divided region of the light source section 5 is increased, so that the scanning timing of the liquid crystal in one corresponding divided screen region becomes longer. As a result, the liquid crystal scanning timing is greatly different between the upper and lower portions even in one divided screen region.

Figure 7:
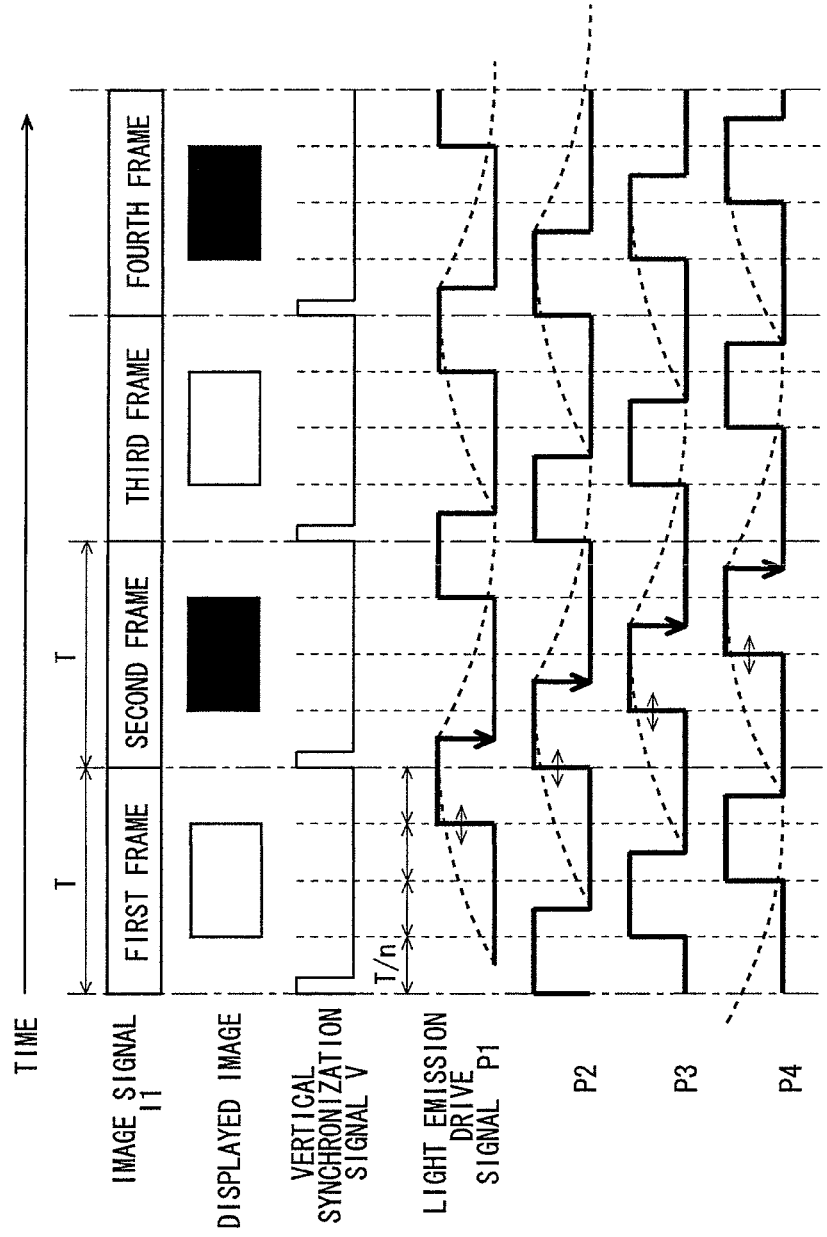

In such a case, as shown in FIG. 7, assuming the scanning start time in the center position of the vertical width of one divided screen region, the timing generation section 1 may shift the phases of light emission drive signals P1 to Pn to be uniformly delayed by the scanning start time. The dotted line which indicates liquid crystal response in FIG. 7 indicates liquid crystal response on the scanning line at the center in the vertical position of each of the divided screen regions. For instance, when the number of divided regions n=4, the ¼ period of the vertical scanning period in one frame corresponds to the scanning period in one divided screen region. In this case, in FIG. 6, the timing generation section 1 generates light emission drive signal Pn in which the uppermost portion in each of the divided screen regions is the scanning start point, but in FIG. 7, the timing generation section 1 generates light emission drive signal Pn which is uniformly delayed by the ⅛ period which is half of the ¼ period of the vertical scanning from the timing shown in FIG. 6. In this manner, the timing generation section 1 may also adjust the phase of light emission drive signal Pn.

As described above, the timing generation section 1 controls the divided regions of the light source section 5 to be sequentially turned on in synchronization with the scanning of the image signal in the liquid crystal panel section 7. With this, each of the divided regions of the light source section 5 can be turned on at the appropriate timing corresponding to liquid crystal response. Therefore, the divided region corresponding to the divided screen region in which the liquid crystal of the liquid crystal panel section 7 sufficiently responds can be turned on, that is, the light source section 5 can be turned on when the liquid crystal is in the appropriate state, so that the moving image blur (moving blur) of the displayed image can be prevented.

On the other hand, a light emitter such as a laser and LED changes its light emission intensity with device temperature change and with rime. In addition, since there is the individual difference in light emission amount in the light emitting device itself, the color balance between the light sources is changed, with the result that unintended coloring and color unevenness can occur on the image displayed. To cope with such change of the light source of the light source section 5, the light intensity of the light source section 5 is detected by the light detection section 3 to correct the changed brightness and color by feedback control.

To perform the light detection, the timing generation section 1 generates light detection gate signal GE for indicating the predetermined light detection period to output light detection gate signal GE to the light detection section 3. That is, the timing generation section 1 generates light detection gate signal GE which allows the detection of the light detection section 3 to be effective in the predetermined period (hereinafter, called as "light detection period Ta"), and then outputs light detection gate signal GE to the light detection section 3. The light detection section 3 performs light detection in light detection period Ta in which light detection gate signal GE is significant, that is, measures the light amount of the light received from the light guide section 6 (the light received from the light source section 5).

Figure 8:
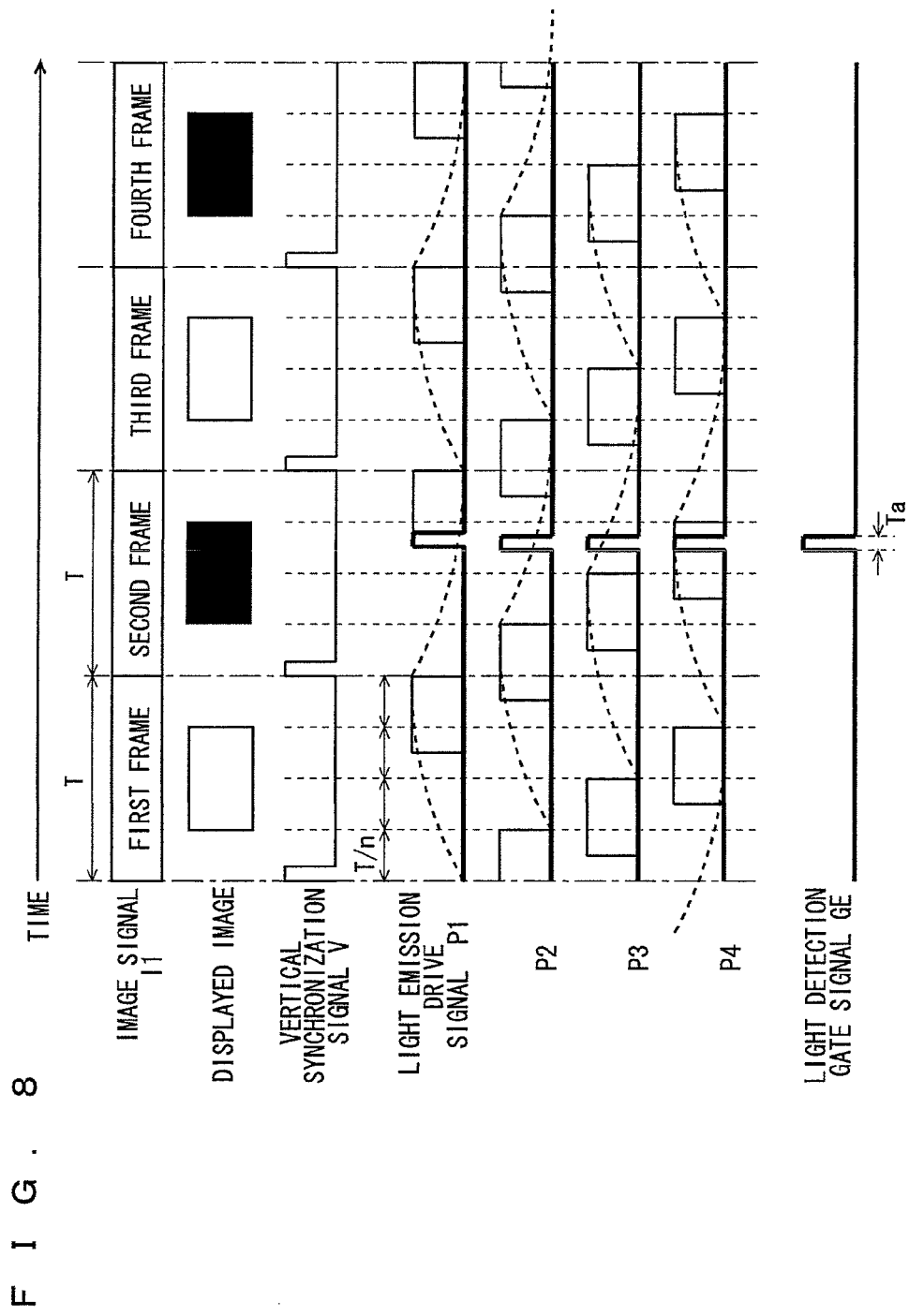
FIG. 8 is a timing chart showing an image signal, liquid crystal response, and various signals of the image display device according to the first preferred embodiment.

FIG. 8 is a timing chart showing an example of the timing relation among image signal I1, liquid crystal response of the liquid crystal panel section 7, and various signals such as light emission drive signal Pn and light detection gate signal GE, in the image display device according to this preferred embodiment. The timing generation section 1 controls light detection gate signal GE to be significant in light detection period Ta which is short but sufficient for performing light detection, and at the same time, controls light emission drive signals Pn in all the divided regions of the light source section 5 to be significant in light detection period Ta. That is, the timing generation section 1 controls the light sources in all the divided regions of the light source section 5 to be turned on in light detection period Ta in which the light detection section 3 executes light detection.

In FIG. 8, the thin solid line of light emission drive signal Pn indicates the turning-on timing for sequential turning-on, and the thick solid line indicates the turning-on timing for light detection. In FIG. 8, the turning-on timing indicated by the thick solid line of light emission drive signal Pn is significant at the same timing as light detection gate signal GE. As a result, in this preferred embodiment, the light source in each of the divided regions is turned on in the period obtained by logical OR of the period of the turning-on timing indicated by the thin solid line and the period of the turning-on timing indicated by the thick solid line.

By summarizing the contents described with reference to FIGS. 5 to 8, the timing generation section 1 according to this preferred embodiment generates light emission drive signal Pn which turns on each of the divided regions of the light source section 5 according to the scanning in the liquid crystal panel section 7, and which turns on all the divided regions of the light source section 5 in light detection period Ta. In addition, the timing generation section 1 generates light detection gate signal GE for allowing the detection of the light detection section 3 to be effective in light detection period Ta.

Figure 9:
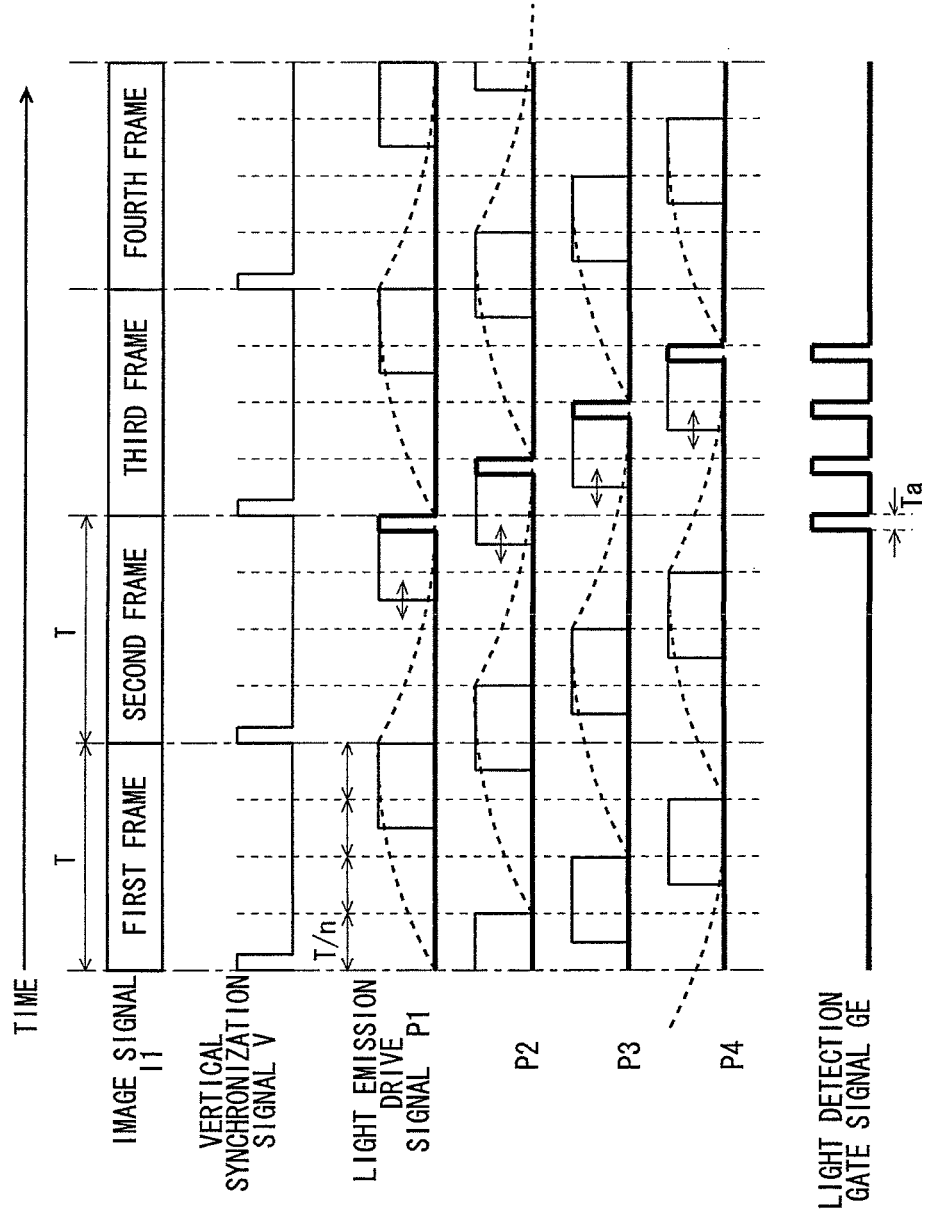
FIGS. 9 and 10 are timing charts each showing an image signal, liquid crystal response, and various signals.

Next, another configuration which individually performing the light detection of the light source in each of the divided regions at the same timing as the turning-on timing at which the light sources in the divided regions are sequentially turned on will be described. FIG. 9 is a timing chart showing the timing relation of light emission drive signal Pn generated in this configuration. According to light emission drive signal Pn shown in FIG. 9, in the period (which is indicated by the thick solid line) in the turning-on timing for sequential turning-on indicated by the thin solid line, the light detection of the light source is performed in each of the divided regions. That is, unlike FIG. 8, light detection period Ta for only light detection is not provided in light emission drive signal Pn shown in FIG. 9, and turning-on for light detection is performed at the same timing as sequential turning-on. In this case, the timing generation section 1 is configured to control light detection gate signal GE to be significant at the timing at which the light of the light source in each of the divided regions is turned on.

In the timing relation shown in FIG. 9, at the timing at which the light amount of the light source in one divided region is detected, the light source in one divided region is turned on, and the light source in the divided region adjacent thereto is also turned on. For instance, in FIG. 9, in light detection period Ta in the divided region corresponding to light emission drive signal P1, light emission drive signal P2 in the divided region adjacent thereto is also significant. As described above, the light guide section 6 can diffuse the light in a wide range, so that the light emitted by the light source in one divided region reaches the region corresponding to the divided region of the light guide section 6, the region adjacent thereto, and the region away therefrom. Therefore, the light amount detected in light detection period Ta includes the light amount of the light source of the divided region turned on by light emission drive signal P1 and the light amount of the light source in the divided region turned on by light emission drive signal P2. Consequently, the light amount of the light source in one divided region cannot be precisely detected.

Figure 10:
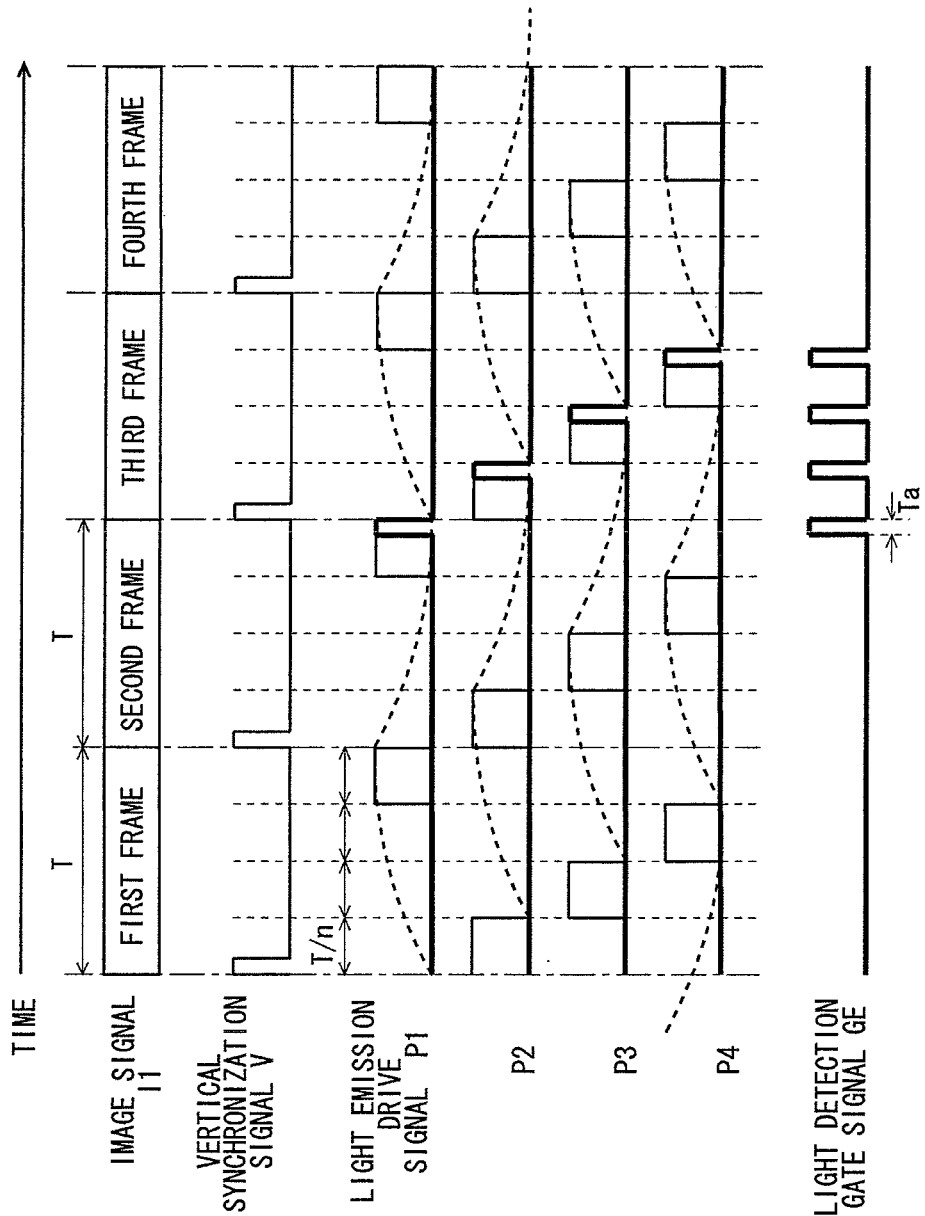

In addition, when the brightness is changed as described above, for instance, when the user controls the brightness to be lowered, the light emission period for sequential turning-on becomes short, as shown in FIG. 10. In FIG. 10, the light amount of only the light emitted from the light source in the region corresponding to light emission drive signal P1 is detected in light detection period Ta, which eliminates the influence of the light from the region adjacent thereto. However, when the user controls the brightness to be higher, the divided region to be detected and the divided region adjacent thereto are turned on in light detection period Ta. Consequently, the same problem as the configuration shown in FIG. 9 occurs.

As described above with reference to FIGS. 9 and 10, when the light detection of the light source in each of the divided regions is individually performed at the same timing as the turning-on timing for sequentially turning on the light sources in the divided regions, the light amount detected by the light detection section 3 cannot be fixed according to the brightness setting conditions. In addition, the another configuration in which turning on the light and detecting the light are fixed at the turning-on timing and in light detection period Ta which are shown in FIG. 10 can be considered, but in this configuration, the brightness cannot be increased any more.

On the contrary, in the image display device according to this preferred embodiment, as shown in FIG. 8, all the divided regions of the light source section 5 are turned on at the timing at which the light detection section 3 performs light detection. Therefore, the light intensity detection for controlling the light emission intensity of each of the divided regions of the light source section 5 can be stably and precisely performed. In addition, the brightness can be changed in a wide range. Further, each of the divided regions of the light source section 5 is turned on according to the scanning in the liquid crystal panel section 7. This can prevent moving image blur.

According to this preferred embodiment, as described above, the light source control section 4 to which light detection value D detected by the light detection section 3 is inputted controls (determines) light emission intensity value E by comparing light detection value D with reference light detection value MD. Therefore, the change of the brightness and color displayed can be prevented.

When the control is performed as shown in FIG. 8, the light emission period for light detection occurs in the period other than the timing at which the light sources in the divided regions are sequentially turned on. Therefore, desirably, the light emission period for light detection (light detection period Ta) is a short period in which the light detection section 3 (photosensor) can detect significant light, and is a period which cannot affect image display quality, that is, an instant period which is imperceptible to a human.

Further, according to this preferred embodiment, the light amount is detected in the period in which the light sources in all the divided regions are turned on at the same time. Therefore, even when the light detection section 3 is arranged in any place between the liquid crystal panel section 7 and the light guide section 6, the light amount can be stably detected. The degree of freedom of the arrangement can thus be increased.

Light emission drive signal Pn which can control the light sources in the divided regions to be turned on at the same time, the control of light detection gate signal GE which enables the light detection control in that period, and the adjust method of the brightness and color have been described above. However, the light turning-on and detection of the light and the brightness adjustment and the color adjustment may be performed in each of the frames. Alternatively, the adjustment may be performed by several frames or by several seconds and minutes. That is, the turning-on of the light source section 5 and the detection of the light detection section 3 in light detection period Ta may be performed in each predetermined cycle being longer than one frame of the image signal. When the turning-on and detection are performed at relatively long intervals, not in each of the frames, the processing amount for light detection and the brightness adjustment and the color adjustment can be reduced.

Second Preferred Embodiment

In the first preferred embodiment, the timing generation section 1 generates light emission drive signal Pn and light detection gate signal GE, based on vertical synchronization signal V included in image signal I1. On the contrary, in a second preferred embodiment of the present invention, the timing generation section 1 generates light emission drive signal Pn and light detection gate signal GE, based on image effective signal DE included in image signal I1. In the image display device according to this preferred embodiment, the configuration and operation other than the timing generation section 1 are the same as the first preferred embodiment, and the description thereof is omitted.

Image effective signal DE indicates the period in which actual image data is transmitted in one frame period of an image. In the period in which the image effective signal is significant (image effective period), the gray scale level of the image is written into the liquid crystal of the liquid crystal panel section 7. One frame period of the image is equal to the sum of the image effective period and the blanking period. The blanking period is referred to as a period in which writing image is not performed. For instance, in the standard high vision signal, the total of 1080 vertical lines represents the image effective period, but the total number of lines per one vertical cycle is 1125. The difference, 45 lines, represents the blanking period.

Figure 11:
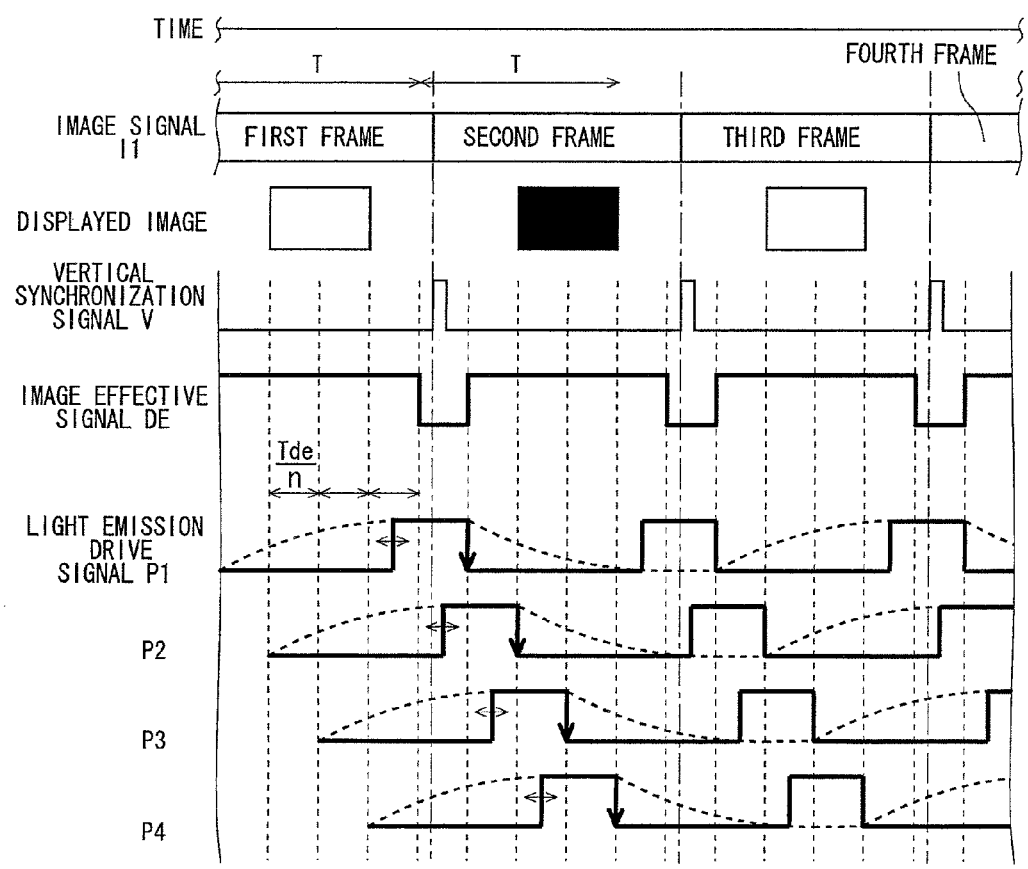
FIG. 11 is a timing chart showing an image signal, liquid crystal response, and various signals of the image display device according to a second preferred embodiment.

Next, the detailed operation of the image display device according to this preferred embodiment will be described with reference to FIG. 11. FIG. 11 is a timing chart showing the timing relation among image signal I1, liquid crystal response of the liquid crystal panel section 7, and various signals such as vertical synchronization signal V and image effective signal DE included in image signal I1, in the image display device according to this preferred embodiment. In the example of FIG. 11, the High period of image effective signal DE represents the significant period, that is, the image effective period in which image data is effective, and the Low period of image effective signal DE represents the blanking period.

In FIG. 11, the dotted line indicates liquid crystal response, and the thick solid line indicates light emission drive signal Pn which turns on the light source section 5. In FIG. 11, the number of divided regions in the vertical direction of the light source section 5 is 4 (n=4). As expressed by Equation (2), shift amount S of light emission drive signal Pn is determined according to image effective period Tde of image effective signal DE and the number of divided regions n in the vertical direction of the light source section 5.

[Equation 2]
$$S = \frac{Tde}{n} \qquad (2)$$

As shown in FIG. 11, the timing generation section 1 time-shifts, by shift amount S, the fall timing of light emission drive signal Pn which sequentially turns on the light sources of the divided regions. Specifically, the fall timing of light emission drive signal Pn is time-shifted by shift amount S by using the rise timing of image effective signal DE, as a benchmark. The High period of light emission drive signal Pn is the light emission period of the light source in the divided region. Therefore, when the brightness is increased, the timing generation section 1 changes the rise timing without changing the fall timing to increase the High period. On the other hand, when the brightness is decreased, the timing generation section 1 changes the rise timing without changing the fall timing to decrease the High period. In this way, the timing generation section 1 fixes the fall timing of light emission drive signal Pn to adjust the rise timing, thereby adjusting the brightness. The double-headed arrow shown in FIG. 11 indicates the adjustment which increases or decreases the rise timing.

As described above, in the image display device according to this preferred embodiment, the timing control of light emission drive signal Pn is performed based on image effective signal DE. Therefore, the divided regions of the light source section 5 can be sequentially turned on at the timing which is strictly synchronized with image write scanning. Therefore, the divided region corresponding to the divided screen region in which the liquid crystal of the liquid crystal panel section 7 sufficiently responds can be turned on, that is, the light source section 5 can be turned on when the liquid crystal is in the appropriate state, so that moving image blur of the displayed image can be prevented.

Third Preferred Embodiment

Figure 12:
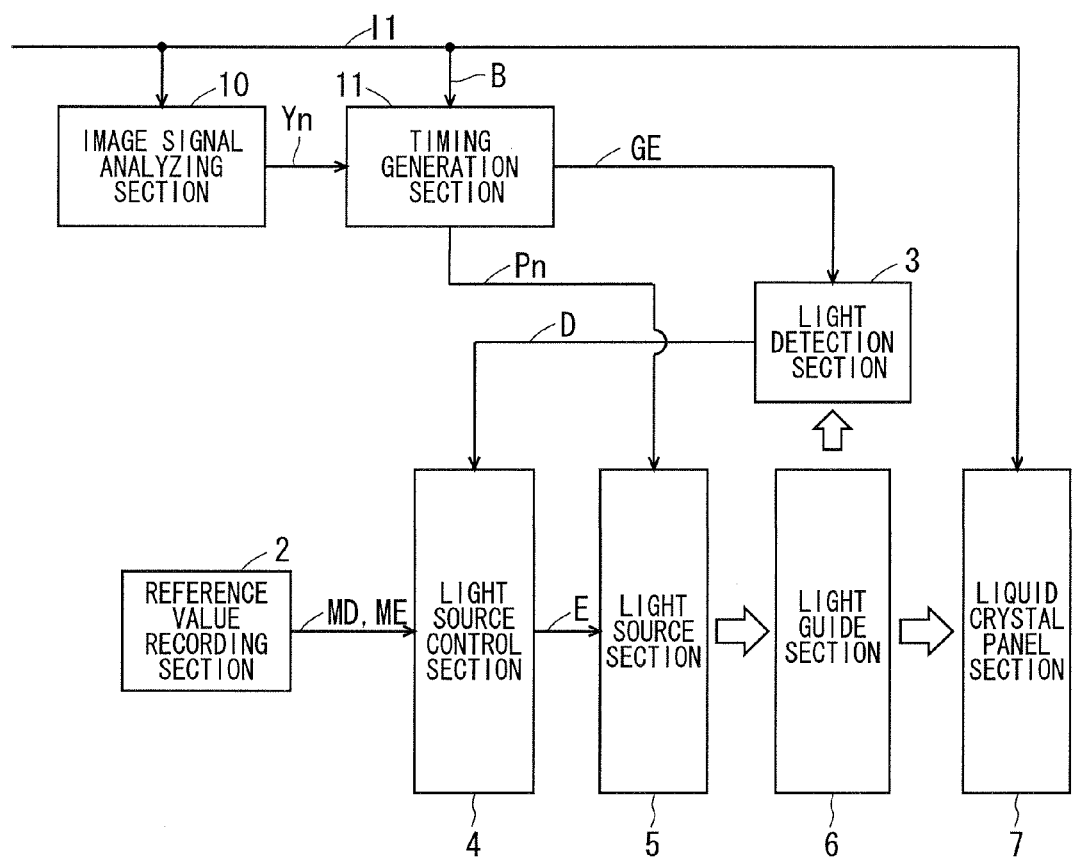
FIG. 12 is a block diagram showing the configuration of the image display device according to a third preferred embodiment.

FIG. 12 is a block diagram showing the configuration of the image display device according to the third preferred embodiment of the present invention. The image display device shown in FIG. 12 includes the reference value recording section 2, the light detection section 3, the light source control section 4, the light source section 5, the light guide section 6, the liquid crystal panel section 7, an image signal analyzing section 10, and a timing generation section 11. In the image display device according to this preferred embodiment, the configuration and operation other than the image signal analyzing section 10 and the timing generation section 11 are the same as the first preferred embodiment, and the description thereof is omitted.

Image signal I1 is inputted to the image signal analyzing section 10 and the liquid crystal panel section 7. In addition, image reference signal B included in image signal I1 is inputted to the timing generation section 11. That is, except that image signal I1 is inputted to the image signal analyzing section 10, the input of image signal I1 and image reference signal B in this preferred embodiment is the same as the first preferred embodiment.

The image signal analyzing section 10 analyzes the brightness of image signal I1 (here, brightness information) with respect to each of the divided regions of the light source section 5, and generates image analyzing information Yn indicating the analyzed result to output image analyzing information Yn to the timing generation section 11. That is, the image analyzing information Yn includes same number of signals as the number of divided regions (Y1, Y2, ..., Yn).

The timing generation section 11 is basically the same function block section as the timing generation section 1 described in the first preferred embodiment. The timing generation section 11 generates light detection gate signal GE allowing the light detection section 3 to detect the light intensity of the light source section 5 based on image reference signal B, and then outputs light detection gate signal GE to the light detection section 3. In addition, the timing generation section 11 generates light emission drive signal Pn turning on and off the light source section 5 based on image reference signal B, and then outputs light emission drive signal Pn to the light source section 5. The light emission drive signal Pn includes same number of signals as the number of divided regions of the light source section 5.

Figure 13:
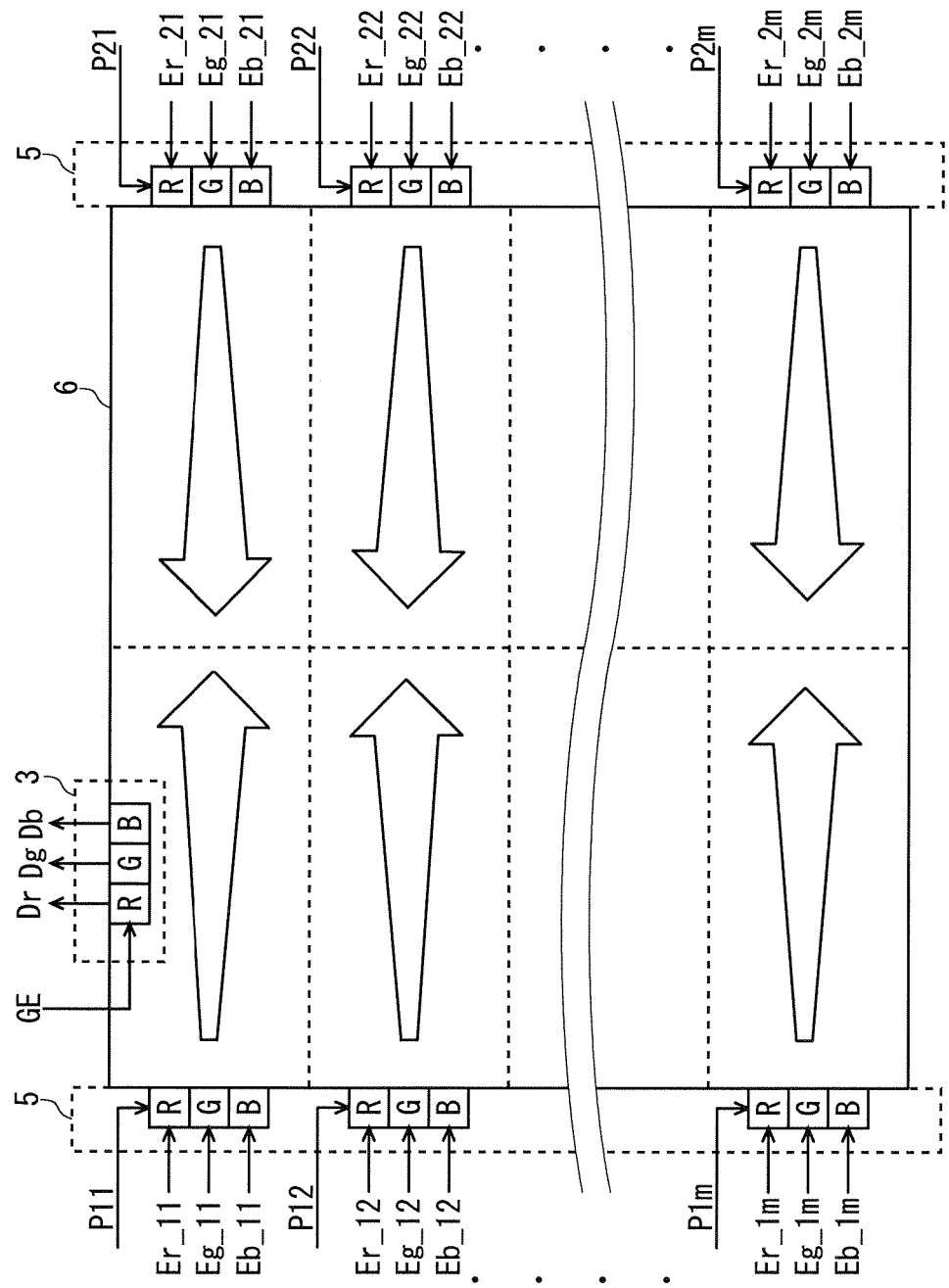
FIG. 13 is a diagram showing the arrangement of the components of the image display device according to the third preferred embodiment.

FIG. 13 shows an example of the arrangement of the light detection section 3, the light source section 5, and the light guide section 6 on the rear surface of the liquid crystal panel section 7. In the example shown in FIG. 13, the light guide plate which is one kind of the light guide section 6 is provided on the rear surface of the liquid crystal panel section 7, and the light source section 5 is arranged on the left side of the light guide plate (at the left and right ends of the liquid crystal panel section 7). Here, the light detection section 3 is arranged at the upper end of the light guide plate in plan view, but, as described above, the light detection section 3 may be arranged in any place as long as the light detection section 3 is arranged between the light guide plate 6 and the liquid crystal panel section 7.

In FIG. 13, the light source which can be independently controlled (in FIG. 13, the three-color light source in red (R), green (G), and blue (B)) is arranged in the light source section 5 in each of n (=2×m) divided regions in which two divided regions are arranged in the horizontal direction and m divided regions are arranged in the vertical direction. The light emitted from the light source section 5 is surface-diffused by the light guide section 6, and is then guided from end to end of the liquid crystal panel in plan view. During light guiding, the lights of the three-color light source in red (R), green (G), and blue (B) are mixed to be white light. Then, the diffused light is detected by the light detection section 3. In FIG. 13, Er_11, Eg_11, and Eb_11 mean light emission intensity value E of the three-color light source in the divided region on the upper left side of FIG. 13, and Dr, Dg, and Db mean light detection value D of the three colors.

The light guide section 6 can diffuse the light in a wide range without light unevenness. Therefore, the light emitted from the light source in one divided region of the light source section 5 illuminates one corresponding region in the light guide section 6 (the range indicated by the dotted line on the light guide section 6 in FIG. 13), and slightly illuminates the region adjacent thereto or the region away therefrom in the light guide section 6. In other words, one region of the light guide section 6 is illuminated, with the total light amount of the light emitted from the light source in one corresponding divided region of the light source section 5, and the slight lights emitted from the light source in the divided region adjacent thereto and the light source in the divided region away therefrom.

Next, the detailed operation of the image display device according to this preferred embodiment will be described. First, the operation of the image signal analyzing section 10 will be described in detail by taking an example of a specific operation. First, the image signal analyzing section 10 calculates average brightness HYa of the entire screen of image signal I1. Next, the image signal analyzing section 10 calculates average brightness HYn (HY1, HY2, ...) in each of the divided screen regions of the input image corresponding to the divided region. As shown in FIG. 13, for instance, when the screen region is divided into two in the horizontal direction and into four in the vertical direction, the image signal analyzing section 10 calculates average brightness in each of eight divided screen regions obtained by dividing the screen region into two in the horizontal direction and into four in the vertical direction. Then, the image signal analyzing section 10 generates image analyzing information Yn based on average brightness HYa of the entire screen and average brightness HYn in each of the divided screen regions. Image analyzing information Yn may be the compared result of average brightness HYa of the entire screen and average brightness HYn in each of the divided screen regions, or may be the difference between these, as expressed by Equation (3).

[Equation 3]

$$Yn = g \times (HYn - HYa) \qquad (3)$$

Here, g is gain information for determining the influence of the average brightness difference on image analyzing information Yn. The unit of image analyzing information Yn may be represented by e.g., a percentage so that the minimum average brightness value is 0% and the maximum average brightness value is 100%, or may be represented by the gray scale level value of plural bits (in the case of 8 bits, the value in the range of 0 to 255). In addition, the unit of image analyzing information Yn may be allocated to the normalized brightness level.

In FIGS. 14A and 14B, the operation of the image display device according to this preferred embodiment will be described in more detail by taking a specific example of image signal I1. In the example of FIGS. 14A and 14B, the light source section 5 is divided into two in the horizontal direction and into four in the vertical direction, and the dotted line in the drawing indicates the border line of the divided screen region corresponding to the divided region. In FIG. 14A, as an example of the image indicated by image signal I1, the image of the bright sun and a dark cloud in the sky is shown.

FIG. 14B shows an example of image analyzing information Yn generated based on image signal I1 in which the image signal analyzing section 10 shows the image of FIG. 14A. Here, for simplification, the average brightness of the image in each of the divided screen regions (in each of the divided regions of the light source section 5) is represented by five levels. Brightness level L1 represents the lowest average brightness level, and brightness level L5 represents the highest average brightness level. In addition, average brightness HYa of the entire screen is at brightness level L3.

For instance, since the average brightness of the uppermost divided screen region on the left side is the same as the average brightness of the entire screen, the image signal analyzing section 10 generates image analyzing information Y11=0 with respect to the divided screen region (divided region). In addition, for instance, since the average brightness of the second top divided screen region on the right side in which the sun is displayed is higher than the average brightness of the entire screen, the image signal analyzing section 10 generates image analyzing information Y22=+2 with respect to the divided screen region (divided region). Further, for instance, since the average brightness of the lowermost divided screen region on the left side in which the dark cloud is displayed is lower than the average brightness of the entire screen, the image signal analyzing section 10 generates image analyzing information Y14=−2 with respect to the divided screen region (divided region).

The image signal analyzing section 10 compares the average brightness of the divided screen region with the average brightness of the entire screen to output image analyzing information Yn. Then, the image signal analyzing section 10 generates image analyzing information Yn with a large value with respect to the divided region corresponding to the divided screen region having a higher average brightness than the entire screen. The image signal analyzing section 10 generates image analyzing information Yn with a small value with respect to the divided region corresponding to the divided screen region having a lower average brightness than the entire screen. In the above example, the brightness information of the image is used to determine image analyzing information Yn, but, for instance, the brightness information of the image may be substituted for the average value of the signal having the highest gray scale level among red (R), green (G), and blue (B) of the image signal to determine image analyzing information Yn.

Figure 15:
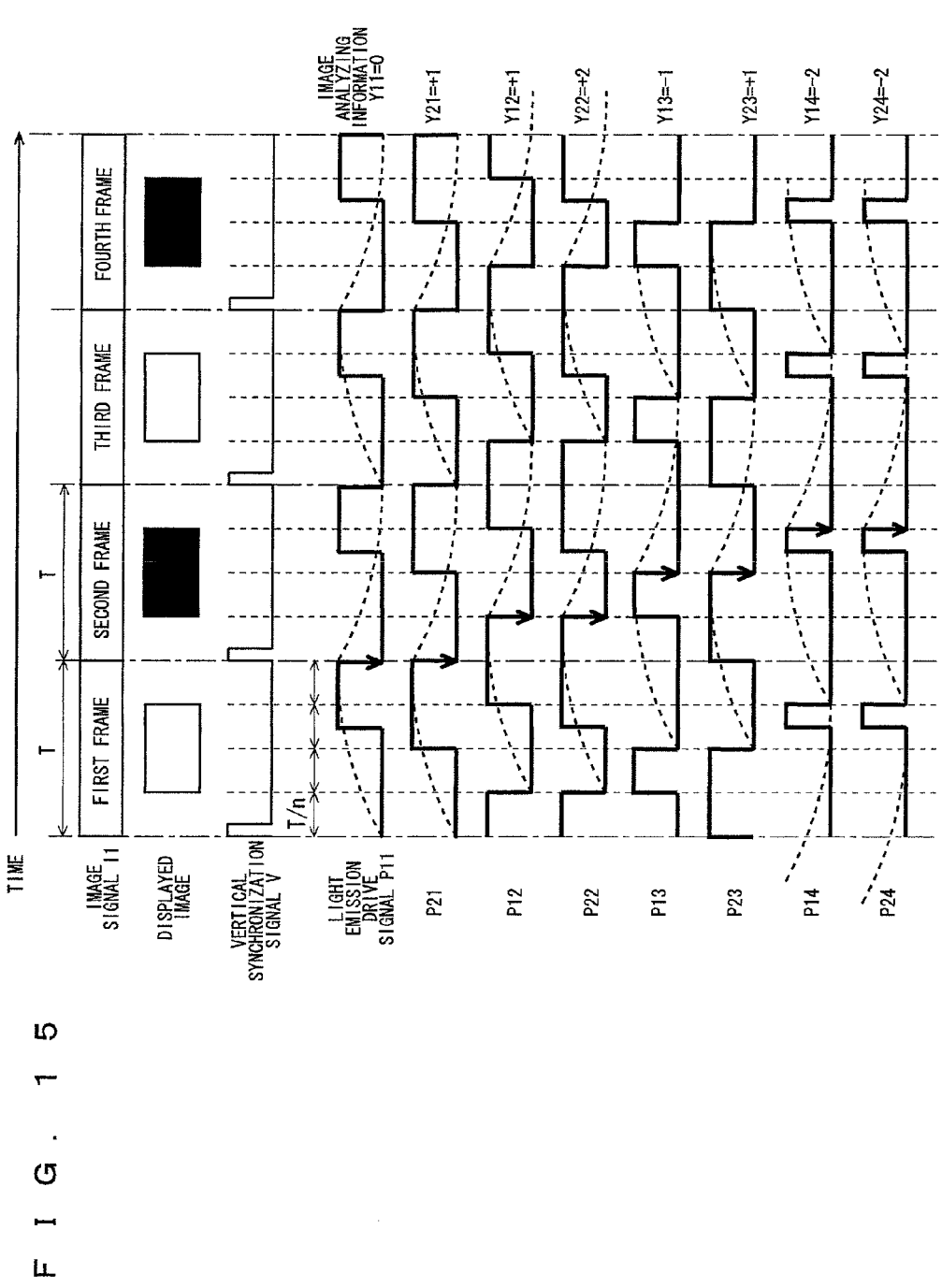
FIG. 15 is a timing chart showing an image signal, liquid crystal response, and various signals of the image display device according to the third preferred embodiment.

Next, the operation of the timing generation section 11 will be described in detail. FIG. 15 is a timing chart showing an example of the timing relation among image signal I1, liquid crystal response of the liquid crystal panel section 7, and various signals such as light emission drive signal Pn and light detection gate signal GE when image signal I1 indicating the image in FIG. 14 is inputted. Vertical synchronization signal V is a signal indicating the head timing of each of the frames, and is synchronized with image signal I1. In the example of FIG. 15, T is the cycle of one frame. Like FIG. 5, in FIG. 15, the dotted line indicates liquid crystal response, the thick solid line indicates light emission drive signal Pn inputted to the light source section 5, and the number of divided regions of the light source section 5 is 8 (when the light source section 5 is divided into two in the horizontal direction and into four in the vertical direction).

Like the timing generation section 1 described in the first preferred embodiment, the timing generation section 11 controls light emission drive signal Pn to fall (or to end the turning-on period) immediately before the start of writing image data in the next frame into the liquid crystal panel, so that the light source section 5 can emit light at the appropriate timing in consideration of liquid crystal response.

Specifically, writing image data into the liquid crystal panel occurs at substantially the same timing in the divided regions in the same position in the vertical direction (the divided regions adjacent to each other in the horizontal direction), so that the timing generation section 11 controls light emission drive signal Pn corresponding to the divided regions to fall at the same timing.

For instance, the timing generation section 11 controls light emission drive signals P11 and P21 in the divided regions corresponding to the uppermost divided screen regions to fall at the same time. In addition, for instance, the timing generation section 11 controls light emission drive signals P12 and P22 in the divided regions adjacent to those divided regions in the vertical direction to fall at the time delayed by shift amount S of the time expressed by Equation (1) from light emission drive signals P11 and P21.

That is, the timing generation section 11 generates the fall of first light emission drive signals P11 and P21, which is delayed by time T from the rise of vertical synchronization signal V, and then performs time-shifting by shift amount S expressed by Equation (1) to generate the fall of light emission drive signals P21 and P22, P31 and P32, . . . , Pm1 and Pm2. For instance, as shown in FIG. 15, when the number of divided regions in the vertical direction of the light source section 5 is 4, the fall point of light emission drive signals P11 and P21 is delayed by time T from vertical synchronization signal V, and the fall point of light emission drive signals P12 and P22 is delayed by the T+T/4 period from vertical synchronization signal V.

The High period of light emission drive signal Pn is the light emission period of the light source in the divided region. Therefore, when the brightness is increased, the timing generation section 11 changes the rise timing without changing the fall timing to increase the High period. On the other hand, when the brightness is decreased, the timing generation section 11 changes the rise timing without changing the fall timing to decrease the High period. In this manner, the timing generation section 11 fixes the fall timing of light emission drive signal Pn to adjust the rise timing, thereby adjusting the brightness.

Here, the timing generation section 11 changes the High period of light emission drive signal Pn based on image analyzing information Yn outputted from the image signal analyzing section 10. That is, the timing generation section 11 controls the High period (turning-on period) in each of the divided regions of the light source section 5 according to the scanning in the liquid crystal panel section 7, based on image analyzing information Yn.

As described above, here, image analyzing information Yn is generated, based on the average brightness of the entire screen and the average brightness in each of the divided screen regions. Accordingly, the timing generation section 11 increases and decreases the High period of light emission drive signal Pn based on image analyzing information Yn, by using the High period of light emission drive signal Pn corresponding to the brightness set value of the entire screen which can be set by the user, as a benchmark.

Specifically, when the value of image analyzing information Yn in the divided screen region is larger than the average brightness value of the entire screen, the timing generation section 11 controls the High period of light emission drive signal Pn in the corresponding divided region to be longer than the reference High period, thereby to increase the brightness in the divided screen region. On the contrary, when the value of image analyzing information Yn in the divided screen region is smaller than the average brightness value of the entire screen, the timing generation section 11 controls the High period of light emission drive signal Pn in the corresponding divided region to be shorter than the reference High period, thereby to decrease the brightness in the divided screen region.

FIG. 15 shows a state where the High period of light emission drive signal Pn in the corresponding divided region is changed according to image analyzing information Yn. In the uppermost divided screen region on the left side shown in FIG. 14, image analyzing information Y11=0. Therefore, the timing generation section 11 controls light emission drive signal P11 in the corresponding divided region to be High in the reference High period. In the uppermost divided screen region on the right side shown in FIG. 14, image analyzing information Y21=+1. Therefore, the timing generation section 11 controls light emission drive signal P21 in the corresponding divided region to be High in the period slightly longer than the reference High period. In the lowermost divided screen region on the right side shown in FIG. 14, image analyzing information Y24=−2. Therefore, the timing generation section 11 controls light emission drive signal P24 in the corresponding divided region to be High in the period shorter than the reference High period.

According to the image display device according to this preferred embodiment, when average brightness HYn of the divided screen region is higher than average brightness HYa of the entire screen, the brightness of the corresponding divided region can be increased. When average brightness HYn of the divided screen region is lower than average brightness HYa of the entire screen, the brightness of the corresponding divided region can be decreased. Therefore, the brightness of the divided region of the light source section 5 can be changed according to the brightness of image signal 11 in each of the divided screen regions, so that the contrast of the displayed image can be higher.

In addition to this operation, the timing generation section 11 according to this preferred embodiment performs the same operation as the timing generation section 1 according to the first preferred embodiment. For instance, the timing generation section 11 generates light emission drive signal Pn which turns on each of the divided regions of the light source section 5 according to the scanning in the liquid crystal panel section 7, and which turns on all the divided regions of the light source section 5 in light detection period Ta. Then, the timing generation section 11 generates light detection gate signal GE which allows the detection of the light detection section 3 to be effective in light detection period Ta. Therefore, like the first preferred embodiment, the light intensity detection for controlling the light emission intensity of each of the divided regions of the light source section 5 can be stably and precisely performed, and moving image blur can be prevented.

While the invention has been shown and described in detail, the foregoing description is in all aspects illustrative and not restrictive. It is therefore understood that numerous modifications and variations can be devised without departing from the scope of the invention.

What is claimed is:

1. An image display device comprising:
a liquid crystal panel section performing sequentially scanning in a predetermined direction in synchronization with an image signal to convert the transmittance of light according to the gray scale level of said image signal;
a light source section including a plurality of light source elements divided into a plurality of regions, each of said plurality of light source elements being capable of turning on red, green, and blue lights;
a light detection section detecting the light intensity of said light source section;
a light source control section controlling the light emission intensity of said light source section based on the light detection value detected by said light detection section; and
a timing generation section generating a light emission drive signal allowing said light source section to emit light and a light detection gate signal allowing said light detection section to detect the light intensity of said light source section, based on an image reference signal included in said image signal,
wherein said timing generation section generates said light emission drive signal which turns on each of said regions of said light source section according to said scanning in said liquid crystal panel section, and which causes the red, green, and blue lights of all of said light source elements to be simultaneously turned on to cause all said regions of said light source section to be simultaneously turned on during a predetermined period in the middle of a turning-on period according to said scanning, and generates said light detection gate signal allowing the detection of said light detection section to be effective only in said predetermined period during which all said regions are simultaneously turned on.

2. The image display device according to claim 1, further comprising a light guide section emitting the light received from said light source section to said liquid crystal panel section, said light detection section being provided between said liquid crystal panel section and said light guide section.

3. The image display device according to claim 1, wherein said image reference signal included in said image signal includes a vertical synchronization signal or an image effective signal.

4. The image display device according to claim 1, wherein the turning-on of said light source section and the detection of said light detection section in said predetermined period are performed in a predetermined cycle which is longer than one frame of said image signal.

5. The image display device according to claim 1, wherein said light source control section controls the light emission intensity of said light source section, based on said light detection value detected by said light detection section and a reference light detection value set previously, said reference light detection value being decreased with the turning-on accumulation time of said light source section.

6. The image display device according to claim 1, further comprising an image signal analyzing section analyzing the brightness of said image signal with respect to each of said regions and generating image analyzing information representing the analyzed result thereof, said timing generation section controlling the turning-on period in each of said regions of said light source section according to said scanning, based on said image analyzing information.

* * * * *